(12) United States Patent
D'Amico et al.

(10) Patent No.: US 9,071,721 B1
(45) Date of Patent: Jun. 30, 2015

(54) CAMERA ARCHITECTURE HAVING A REPOSITIONABLE COLOR FILTER ARRAY

(71) Applicant: Google Inc., Mountain View, CA (US)

(72) Inventors: Samuel R. D'Amico, Menlo Park, CA (US); Xiaoyu Miao, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 161 days.

(21) Appl. No.: 13/724,446

(22) Filed: Dec. 21, 2012

(51) Int. Cl.
  *H04N 5/228* (2006.01)
  *H04N 9/04* (2006.01)
(52) U.S. Cl.
  CPC .................................... *H04N 9/04* (2013.01)
(58) Field of Classification Search
  CPC .............. H01L 27/14603; H01L 27/14621; H01L 27/14623; H01L 27/14627; H01L 27/14643; H01L 27/14812; H01L 27/14818; H04N 5/2254; H04N 9/04; H04N 9/045; H04N 9/07; H04N 9/646
  USPC .............. 348/210.99, 220.1, 222.1, 269, 270, 348/273
  See application file for complete search history.

(56) References Cited

U.S. PATENT DOCUMENTS

| | | | |
|---|---|---|---|
| 4,688,104 A | | 8/1987 | Wolcott |
| 5,986,767 A | * | 11/1999 | Nakano et al. ................. 356/419 |
| 6,236,430 B1 | * | 5/2001 | Suzuki et al. .............. 348/219.1 |
| 6,642,497 B1 | | 11/2003 | Apostolopoulos et al. |
| 2003/0164880 A1 | * | 9/2003 | Mockler ................... 348/207.99 |
| 2005/0030659 A1 | * | 2/2005 | Asakawa ....................... 359/892 |
| 2006/0055807 A1 | | 3/2006 | Pemer |
| 2011/0019036 A1 | * | 1/2011 | Okado ........................... 348/243 |
| 2013/0176401 A1 | * | 7/2013 | Monari et al. .................... 348/47 |

OTHER PUBLICATIONS

Gilblom, D.L., "Color CMOS Cameras," International Robots & Vision Show, Rosemont, IL, Jun. 3, 2003, 8 pages.
Carpio, F.P., "Retinal Space Variant Image Sensor based on CMOS Technology," Computer Science Department, The University of Valencia, Sep. 23, 1998, 350 pages.

* cited by examiner

*Primary Examiner* — Trung Diep
(74) *Attorney, Agent, or Firm* — Blakely Sokoloff Taylor & Zafman LLP

(57) ABSTRACT

A camera system includes an array of image pixels disposed in or on a substrate and laid out in a multi-ring pattern. The array of image pixels is coupled to acquire image data of a color image in response to light incident on the array of image pixels. A color filter array ("CFA") is positioned to color filter the light incident on the array of image pixels and includes at least two different color filter types that filter different color bands of the light. An actuator is coupled to the CFA to adjust the CFA in a sequence and a controller is coupled to the actuator to control the sequence such that each image pixel in the array of image pixels is temporarily optically subtended by each of the at least two different color filter types in the CFA while acquiring the image data associated with the color image.

21 Claims, 7 Drawing Sheets

CAMERA ARCHITECTURE HAVING A REPOSITIONABLE COLOR FILTER ARRAY

TECHNICAL FIELD

This disclosure relates generally to camera systems, and in particular but not exclusively, relates to color filters and image pixel arrays.

BACKGROUND INFORMATION

Conventional cameras use image sensors with an integrated color filter array ("CFA") to capture a color image. The CFA is typically designed to have a Bayer pattern (RGGB) with each pixel on the image sensor subtended by a single color filter element above with a one-to-one correspondence. For example, a 5 megapixel (MP) image sensor includes 1.25 M red pixels, 1.25 M blue pixels, and 2.5 M green pixels. To obtain a full 5 MP color image from this image sensor, a demosaicing process (color interpolation) is required to reconstruct the color image from the incomplete color sample output. The demosaicing process inherently compromises the image quality, particularly the sharpness.

Demosaicing algorithms exist, which strive to improve image sharpness. However, there is a fundamental limit of outcome due to the incomplete color sample from the image sensor. There is often a tradeoff between computing speed and image quality with these algorithms.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Embodiments of a system and method of operation of a camera system having a repositionable color filter array and in some embodiments a circular pixel array are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
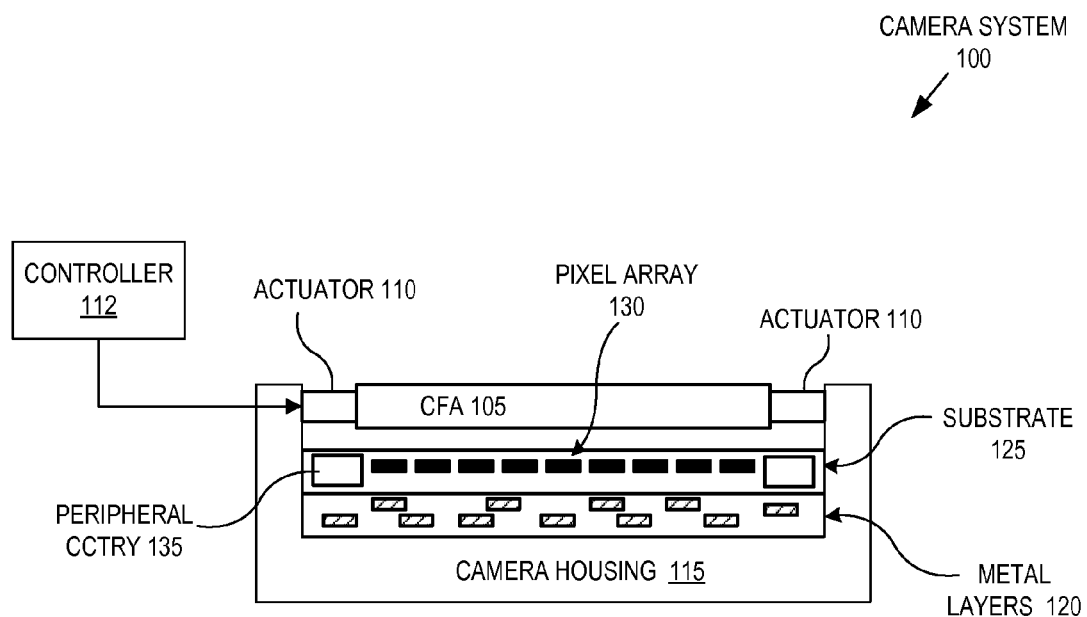
FIG. 1 is a block diagram illustrating a camera system, in accordance with an embodiment of the disclosure.

FIG. 1 is a block diagram illustrating a camera system 100, in accordance with an embodiment of the disclosure. The illustrated embodiment of camera system 100 includes a color filter array ("CFA") 105, an image sensor, an actuator 110, a controller 112, and a camera housing 115. The illustrated embodiment of the image sensor includes metal layers 120 and a substrate 125 having a pixel array 130 and peripheral circuitry 135.

Camera system 100 captures color images from light filtered through CFA 105 and incident onto pixel array 130. In one embodiment, pixel array 130 is a circular pixel array having pixels that are laid out on substrate 125 in a multi-ring pattern, as opposed to a conventional image sensor having a pixel array laid out in rows and columns. Additionally, CFA 105 is adjustable by actuator 110 in a repeated sequence such that each image pixel within pixel array 130 is sequentially exposed to the multiple different color filter types within CFA 105. By exposing each pixel within pixel array 130 to each of the different color types within CFA 105 and subsequently combining the different color frames into a single full color image, the demosaicing procedure necessary in conventional image sensors is avoided. In the case of a RGB (red, green, blue) implementation of CFA 105, each pixel within pixel array 130 is exposed to R, G, and B light in succession. In the example of a 5 MP pixel array, three 5 MP color frame images are sequentially acquired and the color data combined into a true 5 MP color image without loss of sharpness due to demosaicing (i.e., color interpolating).

In the illustrated embodiment, the image sensor is a backside illuminated image sensor having metal layers 120 disposed on the frontside of substrate 125 while pixel array 130 is disposed in or on the backside of substrate 125. Metal layers 120 may include multiple layers of signal lines separated by interlayer dielectric material. Metal layers 120 couple the in-pixel circuitry of each image pixel to peripheral circuitry 135 by routing the signals under pixel array 130 to the peripheral region of substrate 125. Peripheral circuitry 135 may include amplifiers, sample and hold circuitry, analog-to-digital converters, buffers, and various other logic for combining color frames into full color images without need of demosaicing.

CFA 105 may be implemented as a primary color filter including three different types of color filters. For example, CFA 105 may include red, green, and blue color filter types, or cyan, yellow, and magenta color filter types, or otherwise. In other embodiments, CFA 105 may include just two color filter types or more than three color filter types that each filter different color bands of incident light.

CFA 105 is coupled to actuator 110, which in turn is controlled by controller 112. Actuator 110 is coupled to CFA 105 to adjust CFA 105 between sequential acquisition of color frames. In one embodiment, actuator 110 is a linear actuator that translates CFA 105 back and forth and/or side to side. In one embodiment, actuator 110 is a rotating actuator that rotates CFA 105. Actuator 110 may be implemented using a variety of technologies such as a micro-electro-mechanical system ("MEMS") actuator, a piezo-electric crystal actuator, an electrostatic actuator, a micro-motor, a servo, or otherwise. In other embodiments, actuator 110 may manipulate the incident light paths to selectively redirect the incident light through selected color filters via refractive/reflective optical techniques. Controller 112 is coupled to actuator 110 and includes the logic for controlling actuator 110 in a sequential and repeated manner. Controller 112 may be implemented in hardware (e.g., hardware logic gates), software or firmware executing on a general purpose controller, or a combination of both. In one embodiment, controller 112 is included within peripheral circuitry 135 and integrated within substrate 125.

Figure 2A:
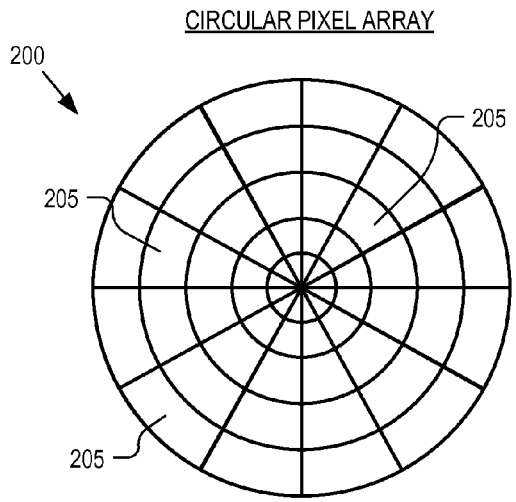
FIGS. 2A and 2B illustrate circular pixel arrays having multi-ring layout patterns, in accordance with an embodiment of the disclosure.
Figure 2B:
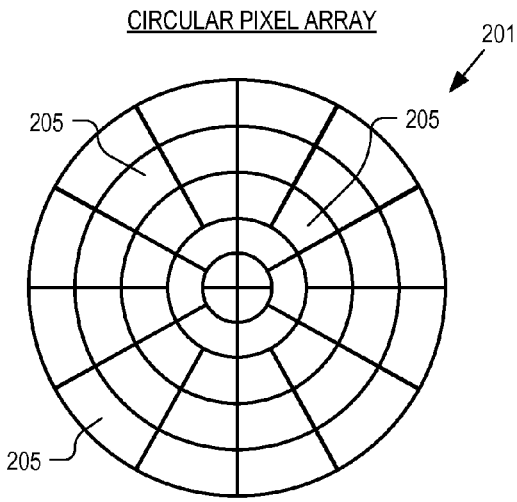

FIGS. 2A and 2B illustrate circular pixel arrays having multi-ring layout patterns, in accordance with an embodiment of the disclosure. FIG. 2A illustrates a circular pixel array 200 having a regular pattern of truncated pie shaped image pixels 205. FIG. 2B illustrates a circular pixel array 201 having an irregular pattern of truncated pie shaped image pixels 205. Both circular pixel arrays 200 and 201 represent example implementations of pixel array 130 illustrated in FIG. 1.

Both circular pixel arrays 200 and 201 organize image pixels 205 into rings (e.g., concentric rings). Image pixels 205 fan out in a radial pattern about the center of the pixel array. As such, a perimeter shape of each image pixel 205 is a truncated pie shape. Circular pixel array 201 illustrates how the layout of image pixels 205 into a ring geometry need not be a regular pattern from one ring to the next and the number of image pixels 205 within each ring need not be consistent over the whole pixel array.

In the illustrated embodiments, image pixels 205 increase in size (e.g., increase in size of the active photo-sensitive surface area of the pixel) with increasing radial distance from the center of the pixel array. Accordingly, with each ring image pixels 205 get larger and larger. As such, circular pixel arrays 200 and 201 have a non-uniform pixel resolution and a non-uniform light sensitivity. The increased sized image pixels 205 near the outer perimeter of the pixel arrays have a lower pixel resolution and higher light sensitivity compared to image pixels 205 near the inner central region of the pixel arrays. However, these effects are complementary to the optical effects in a typical lens system. For example, when an object lens is positioned in front of either of pixel arrays 200 or 201, for bringing the object image into focus on the pixel array, lens vignetting results in less brightness along the periphery of the lens. Thus, the increase in size of image pixels 205 with radial distance can be designed to compensate for lens vignetting to achieve substantially uniform image brightness in the acquired image. Correspondingly, since image resolution already drops off along the periphery region of lenses, the reduced pixel resolution at the periphery region should have a negligible impact on the overall acquired image quality.

Although FIGS. 2A and 2B illustrate circular pixel arrays 200 and 201 as being perfect circles, it should be appreciated that the overall perimeter shape of pixel arrays 200 and 201 may assume other shapes such as an ellipse or other freeform curvatures. In these alternative embodiments, the shapes of the individual image pixels 200 may also deviate from a truncated pie shape. Although FIG. 2A illustrates pixel array 200 having 60 image pixels 205 and FIG. 2B illustrates pixel array 201 having 46 image pixels 205, it should be appreciated that these figures are merely for illustration purposes and these pixel arrays may in fact be implemented with thousands or millions of image pixels 205. Image pixels 205 may be implemented as a CMOS image sensor with light sensitive photo-diode regions or a charged coupled device ("CCD") image sensor. In one embodiment, image pixels 205 are backside illuminated CMOS image sensors.

Figure 3:
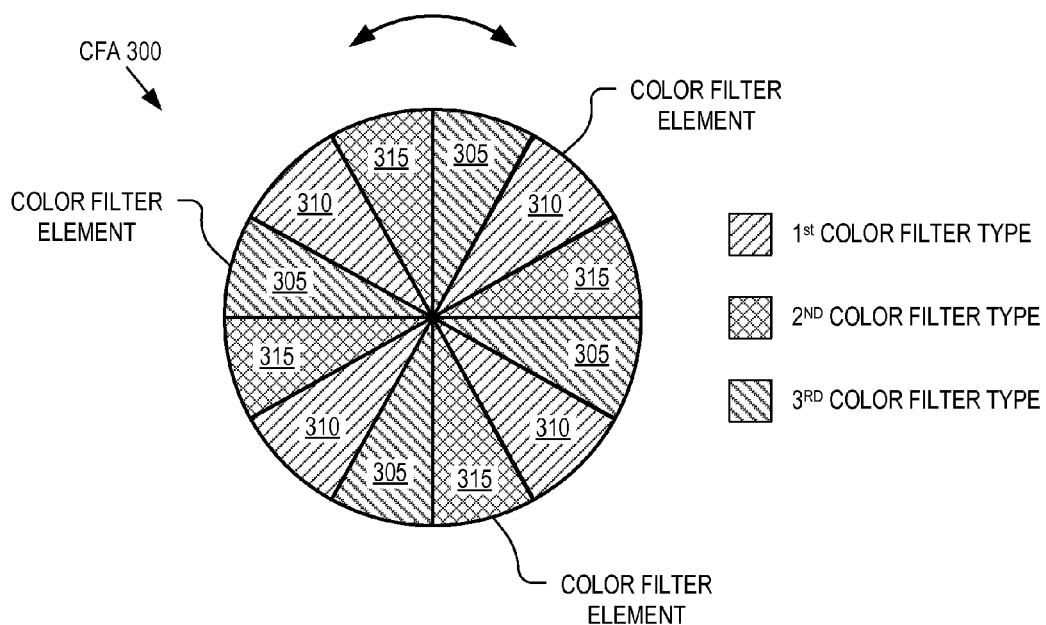
FIG. 3 illustrates a color filter array having a pie shape structure, in accordance with an embodiment of the disclosure.

FIG. 3 illustrates a CFA 300 having a pie shape structure, in accordance with an embodiment of the disclosure. CFA 300 represents one possible implementation of CFA 105 illustrated in FIG. 1. The illustrated embodiment of CFA 300 includes color filter elements 305, 310, and 315 each having a pie shape and laid out in a repeating fan-like pattern. Thus, CFA 300 includes three different color filter types (e.g., red, green, blue or cyan, yellow, magenta, or other primary color patterns) that each filter a different color band of light.

When CFA 300 is position in the optical path of pixel array 130, each color filter element 305, 310, and 315 individually optically subtends multiple image pixels within pixel array 130 (one-to-many correspondence). In other words, the incident light that is filtered through a given color filter element is incident upon multiple image pixels. During operation, CFA 300 is rotated through three sequential positions to acquire three separate color frames of image data. Each position aligns a different color filter type over a given image pixel such that each image pixel is sequentially exposed to light incident from the same angle(s), but filtered through three different color filter types. These frames are subsequently combined to generate a full resolution, full color image without color interpolation (i.e., demosaicing).

Figure 4A:
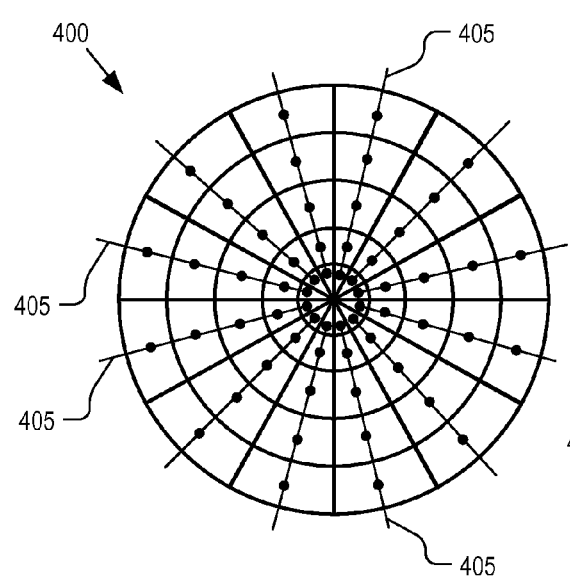
FIGS. 4A and 4B illustrate radial readout lines for reading out image data from circular pixel arrays, in accordance with an embodiment of the disclosure.
Figure 4B:
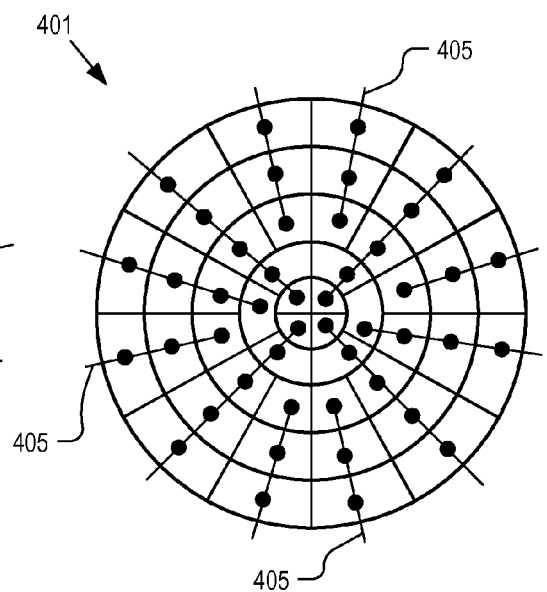

FIGS. 4A and 4B illustrate radial readout line patterns 400 and 401 for reading out image data from circular pixel arrays 200 and 201, respectively, in accordance with an embodiment of the disclosure. Radial readout line patterns 400 and 401 may be implemented in metal layers 120 under pixel array 130 to readout image data acquired by the image pixels to peripheral circuitry 135. Whereas conventional image sensors use x-y grid style column readout or row readout lines to read from an x-y grid style pixel array, radial readout line patterns 400 and 401 use readout lines 405 that run substantially radial from the center of the pixel array out to the periphery. In FIG. 4A, each radial readout line 405 couples to the same number of image pixels and is time shared by the rings of image pixels during readout. In FIG. 4B, the radial readout lines 405 may couple to a variable number of image pixels according to the geometry of the pixel array.

Figure 5:
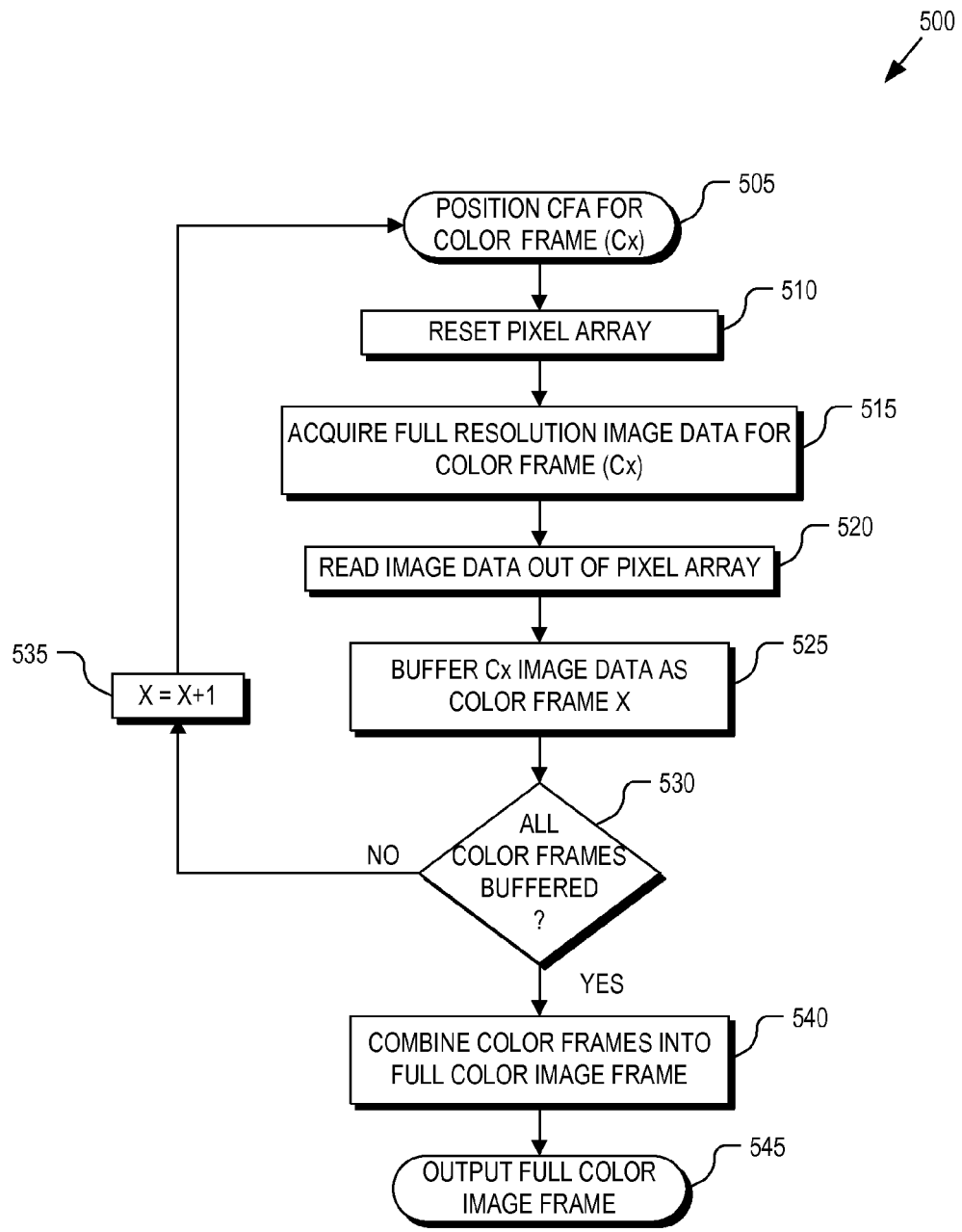
FIG. 5 is a flow chart illustrating a process of operation of a camera system including a circular pixel array, in accordance with an embodiment of the disclosure.

FIG. 5 is a flow chart illustrating a process 500 of operation of camera system 100 including a circular pixel array, in accordance with an embodiment of the disclosure. The order in which some or all of the process blocks appear in process 500 should not be deemed limiting. Rather, one of ordinary skill in the art having the benefit of the present disclosure will understand that some of the process blocks may be executed in a variety of orders not illustrated, or even in parallel.

In a process block 505, CFA 105 is actuated by actuator 110 under control of controller 112 to adjust CFA 105 to acquire the image data for the first color frame Cx. Actuating CFA 105 may include translating CFA 105, rotating CFA 105, or otherwise. In one embodiment, actuating CFA 105 may include manipulating an optical path leading to CFA 105 to redirect incident light through different sections of CFA 105. In yet another embodiment, actuating CFA 105 may include electronically changing the color filtering properties of CFA 105 itself. Depending upon the size and type of CFA 105, the image data acquired for each color frame Cx may include image data for only a single color band (e.g., see CFA 605 illustrated in FIGS. 6A & 6B) or may include image data for multiple different color bands (e.g., CFA 300).

In a process block 510, pixel array 130 is reset. Resetting pixel array 130 includes charging/discharging the photo-sensitive regions to a reset potential in anticipation of acquiring the photo-generated charges associated with the next image frame. In one embodiment, the entire pixel array 130 is globally reset at the same time. In another embodiment, pixel array 130 is reset and read-out in rolling sections (e.g., one ring at a time or otherwise). In this rolling reset and read-out embodiment, reset and image acquisition is sequential in sections over pixel array 130.

In a process block 515, after the image pixels have been reset, the integration period or image acquisition window is commenced. The light incident on pixel array 130 is filtered through CFA 105 while in its current adjustment setting or position. Again, image acquisition may be controlled by a global shutter or a rolling shutter to correspond with the type of reset used.

Once the image data of color frame Cx is acquired, the image data is readout of pixel array 130 into peripheral circuitry 135 via metal layers 120 (process block 520). In one embodiment, readout occurs along radial readout lines 405 one ring at a time. Of course, other readout schemes using other layout orientations of readout lines may be implemented (e.g., see grid readout lines illustrated in FIG. 8). During readout, the image data of the current color frame Cx is temporarily buffered (process block 525). In one embodiment, peripheral circuitry 135 includes a buffer large enough to hold image data associated with three different color frames Cx, one for each adjustment setting of CFA 105.

If additional color frames Cx still need to be acquired within the same exposure cycle of a given color image (decision block 530), process 500 loops back to capture the next color frame Cx (loop 535) and returns to process block 505 where CFA 105 is again adjusted to capture the next color frame Cx. In one embodiment, readjusting CFA 105 includes physically repositioning CFA 105 in an incremental, sequential, and repeating manner. Once the image data associated with all positions of CFA 105 have been captured and readout as separate color frames Cx (decision block 530), process 500 continues to process block 540.

In one embodiment, three separate color frames Cx are captured, one for each of the primary color filter types included within CFA 105. In process block 540, the image data of the separate color frames are combined into a single, full color image frame. The color frames Cx include image data collected for each image pixel when the incident light is filtered through each of the different color filter types. For example, for a given image pixel, color frame C1 may include image data captured when the given image pixel is subtended by a red color filter such that the light incident on that given image pixel is red filtered. The color frame C2 may include image data captured when the given image pixel is subtended by a green color filter such that the light incident on that given image pixel is green filtered. The color frame C3 may include image data captured when the given image pixel is subtended by a blue color filter such that the light incident on that given image pixel is blue filtered. By combining the image data acquired by the given pixel during color frames C1, C2, and C3, a full color image is generated for that single image pixel without need of color interpolation. In other words, image data for all three primary colors is acquired by each pixel at each location within pixel array 130—not interpolating color from a repeating pattern of four different pixels within a Bayer Pattern group that are offset from each other. As such, image sharpness does not suffer due to the demosaicing process used in connection with Bayer Pattern CFAs. Finally, in a process block 545, the full color image frame is output in a process block 545.

Figure 6A:
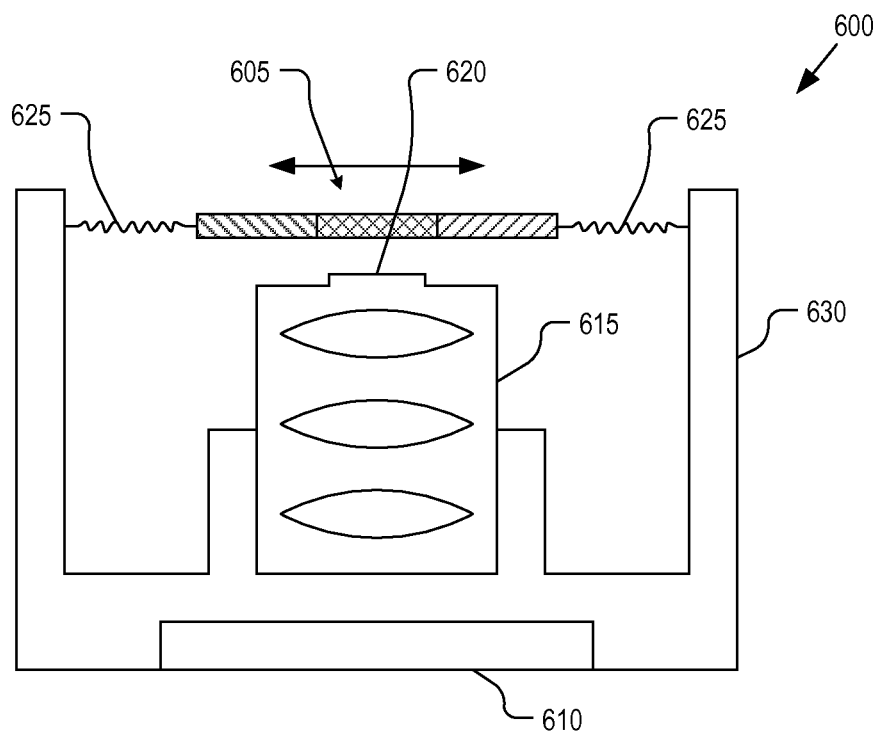
FIGS. 6A and 6B are block diagrams illustrating a camera system having a color filter array that is translated, in accordance with an embodiment of the disclosure.
Figure 6B:
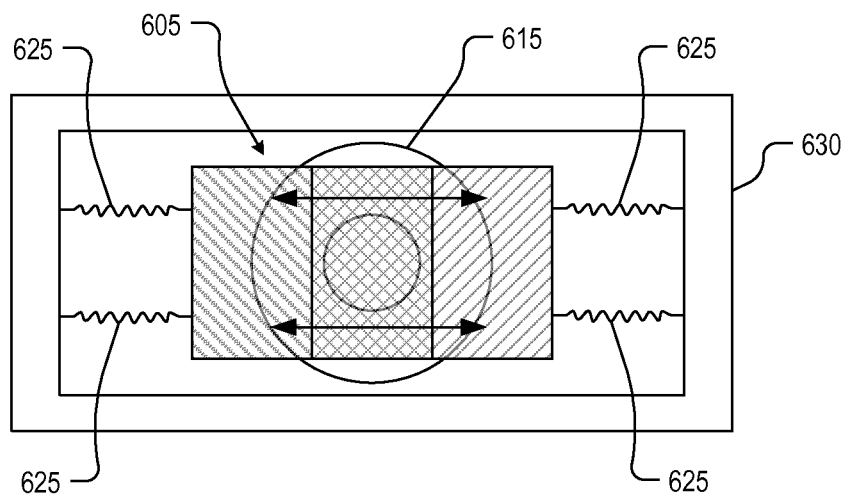

FIGS. 6A and 6B are block diagrams illustrating a camera system 600 having a repositionable color filter array that is translated, in accordance with an embodiment of the disclosure. The illustrated embodiment of camera system 600 includes a CFA 605, an image sensor 610 having a pixel array, a lens assembly 615 having an aperture 620 (also referred to as lens entrance pupil), an actuator 625, and a housing 630.

Image sensor 610 may be implemented with embodiments of circular pixel array 200 or 201 and radial readout lines 400 or 401. In other embodiments, image sensor 610 may be implemented with a conventional rectangular layout pixel array having columns and rows. In the illustrated embodiment, camera system 600 repositions CFA 605 via a translation motion instead of a rotation motion. CFA 605 is positioned external to lens assembly 615 above aperture 620 and is translated between capturing color frames of a color image. The illustrated embodiment of CFA 605 includes filter elements (e.g., three filter elements in the illustrated embodiment) that are large enough to cover aperture 620 such that all image pixels within image sensor 610 are optically subtended by a single filter element at a given time. As such, each color frame Cx captures image data for only a single color band, as opposed to CFA 300. Actuators 625 translate CFA 605 between capturing color frames to sequentially align each filter element in front of aperture 620. Thus, for a three element CFA embodiment, actuators 625 should be capable of physically translating and holding CFA 605 between three positions.

Figure 7:
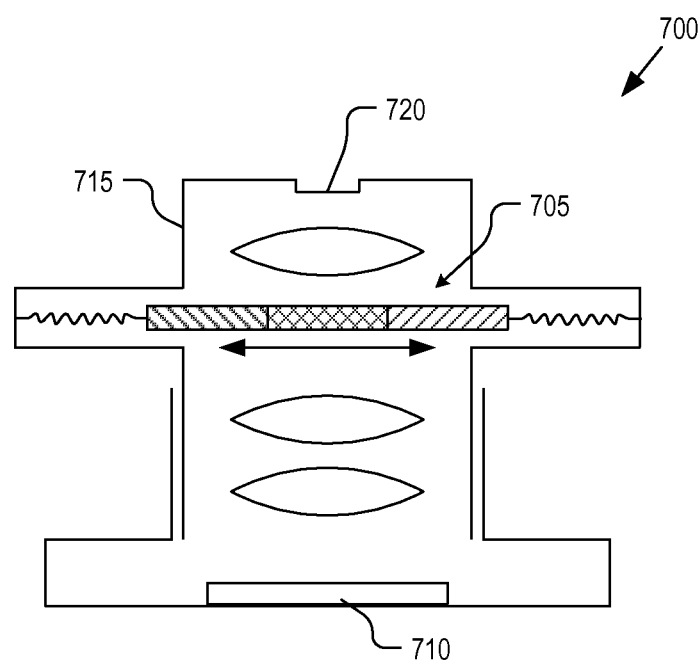
FIG. 7 is a block diagram illustrating a camera system having a color filter array that is translated, in accordance with an embodiment of the disclosure.

FIG. 7 is a block diagram illustrating a camera system 700 having a CFA that is also translated, in accordance with an embodiment of the disclosure. Camera system 700 operates in a similar manner to camera system 600, but integrates CFA 705 internal to the lens assembly 715 such that it is positioned below aperture 720. Image sensor 710 may also be implemented with embodiments of circular pixel array 200 or 201 and radial readout lines 400 or 401 or by using a conventional rectangular pixel array having pixels laid out in columns and rows.

Figure 8:
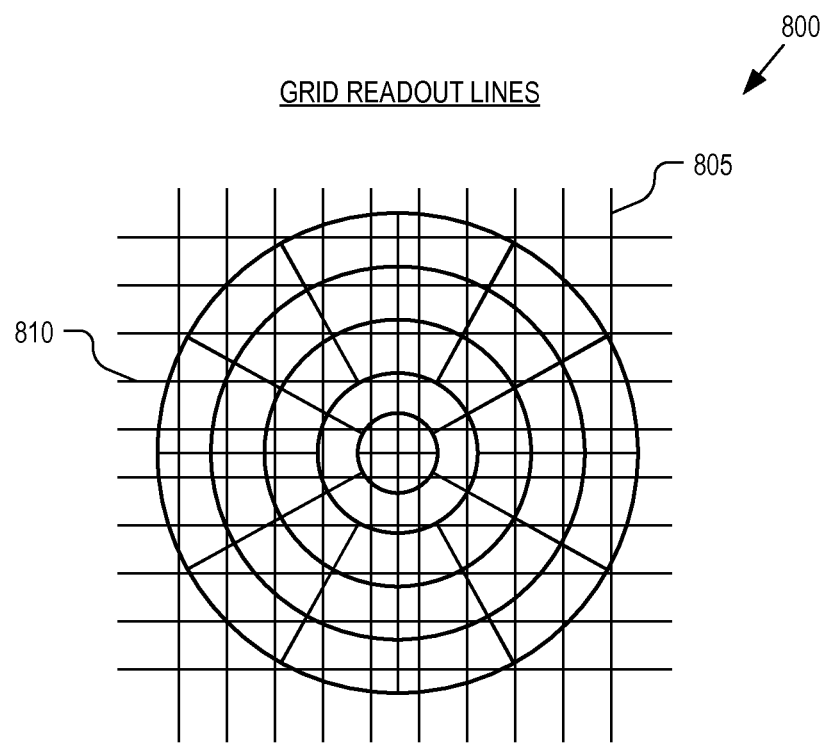
FIG. 8 illustrates straight readout lines for reading out image data from a circular pixel array, in accordance with an embodiment of the disclosure.

FIG. 8 illustrates a straight readout line pattern 800 for reading out image data from a circular pixel array, in accordance with an embodiment of the disclosure. Straight readout line pattern 800 may be implemented in metal layers 120 under pixel array 130 to readout image data acquired by the image pixels to peripheral circuitry 135. Straight readout line pattern 800 uses an x-y grid style of columns 805 or rows 810 to read from a circular pixel array. Since the circular pixel array has increased resolution towards the center, there is a non-uniform amount of data to read out from each column or row readout line 805 or 810. Rather, the columns or rows that extend under the center of the circular pixel array would readout more image data than the lines extending under the peripheral region of the circular pixel array.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A camera system, comprising:
   a substrate having a first side and a second side opposite to the first side;
   an array of image pixels disposed in or on the substrate, the array of image pixels laid out in a multi-ring pattern, wherein the array of image pixels are coupled to acquire image data of a color image in response to light incident on the array of image pixels;
   a color filter array ("CFA") disposed over the first side of the substrate and positioned to color filter the light incident on the array of image pixels, the CFA including at least two different color filter types that filter different color bands of the light, wherein the CFA includes a plurality of color filter elements that optically subtend different portions of the array of image pixels at the same time and wherein each of the color filter elements optically subtends a plurality of the image pixels at a given time;
   an actuator coupled to the CFA to adjust the CFA in a sequence; and
   a controller coupled to the actuator to control the sequence such that each image pixel in the array of image pixels is temporarily optically subtended by each of the at least two different color filter types in the CFA while acquiring the image data associated with the color image.

2. The camera system of claim 1, wherein the CFA includes three different color filter types that filter different color bands of the light, and wherein the controller is coupled to the actuator to control the sequence such that each image pixel in the array of image pixels is temporarily optically subtended by each of the three different color filter types in the CFA while acquiring the image data associated with the color image.

3. The camera system of claim 1, wherein the actuator is coupled to the CFA to adjust a physical position of the CFA by repositioning the CFA in the sequence.

4. The camera system of claim 3, wherein the color filter elements of the CFA are pie shaped, wherein the color filter elements are organized into a repeating pattern of three primary colors, and wherein the actuator comprises a rotating actuator coupled to the CFA to adjust the physical position of the CFA by rotating the CFA in a sequence.

5. The camera system of claim 1, wherein the actuator comprises a translating actuator coupled to the CFA to adjust the physical position of the CFA by translating the CFA in a sequence.

6. The camera system of claim 1, wherein the image pixels have truncated pie perimeter shapes.

7. The camera system of claim 6, wherein the image pixels have an increasing size with increasing distance from a center of the array of image pixels.

8. The camera system of claim 1, wherein the image pixels have a non-uniform size over the array of image pixels.

9. The camera system of claim 1, wherein the array of image pixels has a circular perimeter shape.

10. The camera system of claim 1, further comprising at least one metal layer disposed over the second side of the substrate, the at least one metal layer including readout lines coupled to the array of image pixels to readout the image data acquired by the array of image pixels.

11. The camera system of claim 10, wherein the readout lines are radial readout lines that run along substantially radial paths under the array of image pixels laid out in the substantially radial pattern.

12. The camera system of claim 1, wherein the array of image pixels are laid out in a substantially radial pattern and organized into concentric rings.

13. A method of operating a camera system, comprising:
    positioning a color filter array ("CFA") into a first position over an array of image pixels organized into rings, wherein the CFA includes a plurality of color filter elements that optically subtend different portions of the array of image pixels at the same time and wherein each of the color filter elements optically subtends a plurality of the image pixels at a given time;
    acquiring first image data with the array of image pixels while the CFA is in the first position;
    repositioning the CFA into a second position different from the first position over the array of image pixels;
    acquiring second image data with the array of image pixels while the CFA is in the second position; and
    combining the first image data with the second image data to create a color image.

14. The method of claim 13, further comprising:
    repositioning the CFA into a third position different from the first and second positions over the array of image pixels;
    acquiring third image data with the array of image pixels while the CFA is in the third position; and
    combining the first, second, and third image data to create the color image.

15. The method of claim 13, further comprising:
    reading the first image data out of the array of image pixels into a buffer;
    reading the second image data out of the array of image pixels into the buffer; and
    reading the third image data out of the array of image pixels into the buffer.

16. The method of claim 15, wherein the array of image pixels comprises a circular pixel array and wherein the first, second, and third image data is readout of along radial readout lines that extend along radial paths from a periphery of the circular pixel array to a center of the circular pixel array.

17. The method of claim 13, wherein the CFA is pie-shaped and wherein positioning and repositioning the CFA comprises rotating the CFA.

18. The method of claim 13, wherein the CFA comprises three color filter elements that each filter a different color band of light.

19. The method of claim 13, wherein positioning and repositioning the CFA comprises translating the CFA.

20. A camera system, comprising:
    a substrate having a first side and a second side opposite to the first side;
    an array of image pixels disposed in or on the substrate and coupled to acquire image data of a color image in response to light incident on the array of image pixels;
    a color filter array ("CFA") disposed over the first side of the substrate and positioned to color filter the light incident on the array of image pixels, the CFA including at least two different color filter types that filter different color bands of the light, wherein the CFA includes a plurality of color filter elements that optically subtend different portions of the array of image pixels at the same time and wherein each of the color filter elements optically subtends a plurality of the image pixels at a given time;
    an actuator coupled to the CFA to adjust the CFA in a sequence; and
    a controller coupled to the actuator to control the sequence such that each image pixel in the array of image pixels is temporarily optically subtended by each of the at least two different color filter types in the CFA while acquiring the image data associated with the color image.

21. The camera system of claim 20, wherein the actuator is coupled to the CFA to adjust a physical position of the CFA by repositioning the CFA in the sequence.

* * * * *